Aug. 31, 1943.    A. CORY    2,328,261
MECHANICAL MOVEMENT
Filed June 25, 1941    2 Sheets-Sheet 1

INVENTOR.
Anthony Cory
BY

Aug. 31, 1943.  A. CORY  2,328,261
MECHANICAL MOVEMENT
Filed June 25, 1941  2 Sheets-Sheet 2
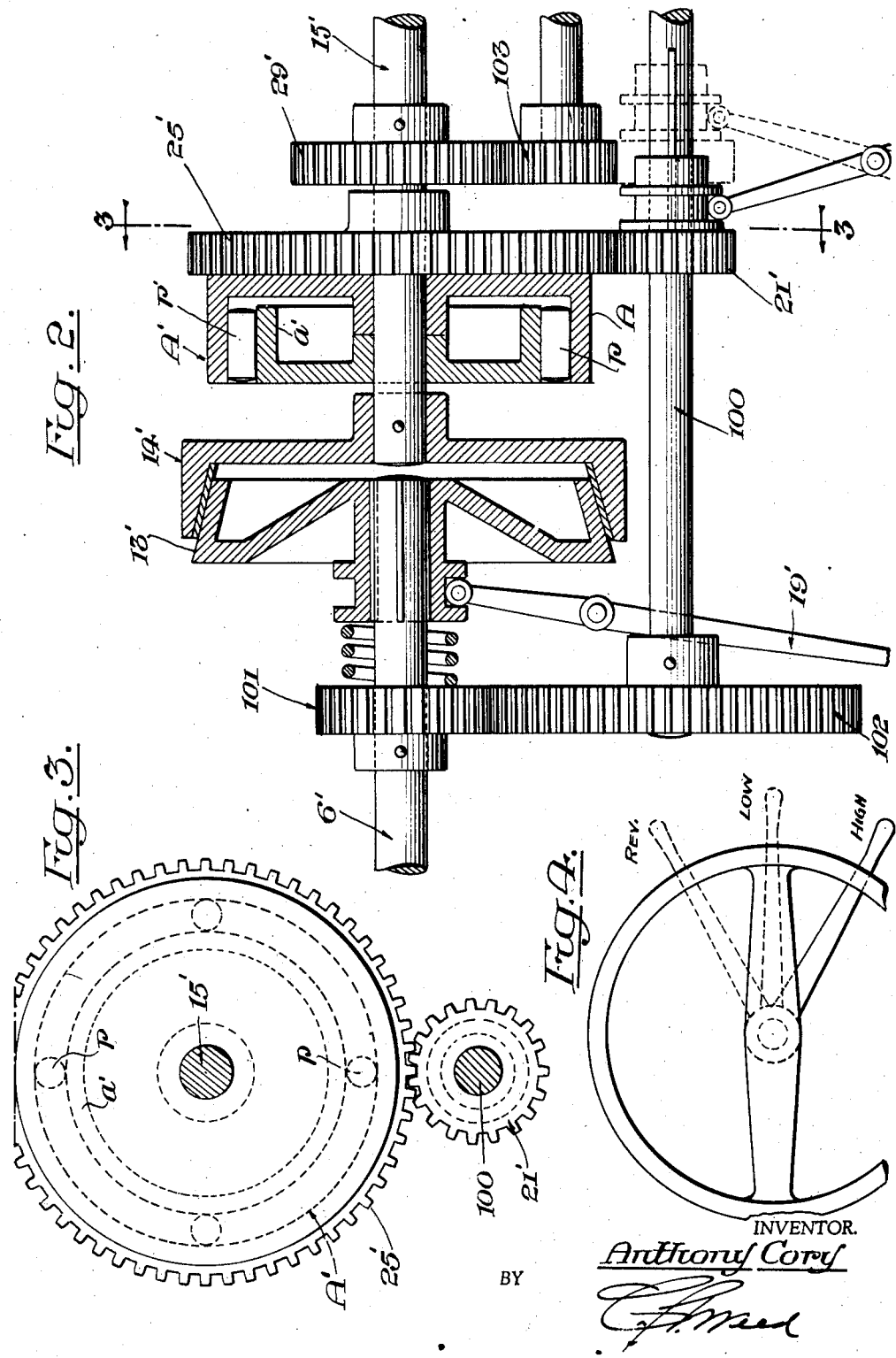
INVENTOR.
Anthony Cory
BY Patented Aug. 31, 1943

2,328,261

UNITED STATES PATENT OFFICE 2,328,261

MECHANICAL MOVEMENT

Anthony Cory, New York, N. Y.

Application June 25, 1941, Serial No. 399,581

11 Claims. (Cl. 74—323)

This invention relates to mechanical movements and more particularly that type known as change speed gearing wherein a change of speed is obtained by a system of gears located between the motive power and the driven element of varied load, an object of the invention being to provide an improved transmission mechanism so constructed that the transmission of power from the motive power to the driven element is obtained in a gradual manner until the driven element is driven at any desired speed without the necessity of shifting from one gear to another.

Another object of the invention is the provision of improved mechanism which eliminates the use of a clutch pedal and has all the advantages of a hydraulic transmission while retaining the high efficiency of the mechanical transmission.

A further object of the invention is the provision of an improved transmission which, when applied to an automobile, for instance, will permit a gradual pick-up in speed and prevent the rolling back of the car when starting and also eliminate the rolling back of the car when at rest with the gearing engaged.

The modern automobile requires the use of transmission mechanism which eliminates the clutch pedal and the change speed gears and which provides easy, smooth starting without complicated operations and this improved transmission mechanism accomplishes the desired result while having all of the advantages of the hydraulic transmission plus the high efficiency of the mechanical transmission mechanism not possessed by any of the hydraulic transmissions, and which will permit coasting, if desired, to save fuel and also possesses an advantage that no other transmission has, namely, it prevents, when in high gear, self-acceleration in the opposite direction, that is to say, the vehicle cannot roll back when the brakes are free and the engine is disconnected although the improvement permits such rolling back when desired.

In the drawings accompanying and forming a part of this specification,

Fig. 2 is a partial sectional plan view of a modified form thereof.

Fig. 3 is a section through 3—3 of Fig. 2, and

Fig. 4 illustrates a stearing wheel of a car having the control lever for operating this improved mechanism.

Similar characters of reference indicate corresponding parts in the several views.

Figure 1:
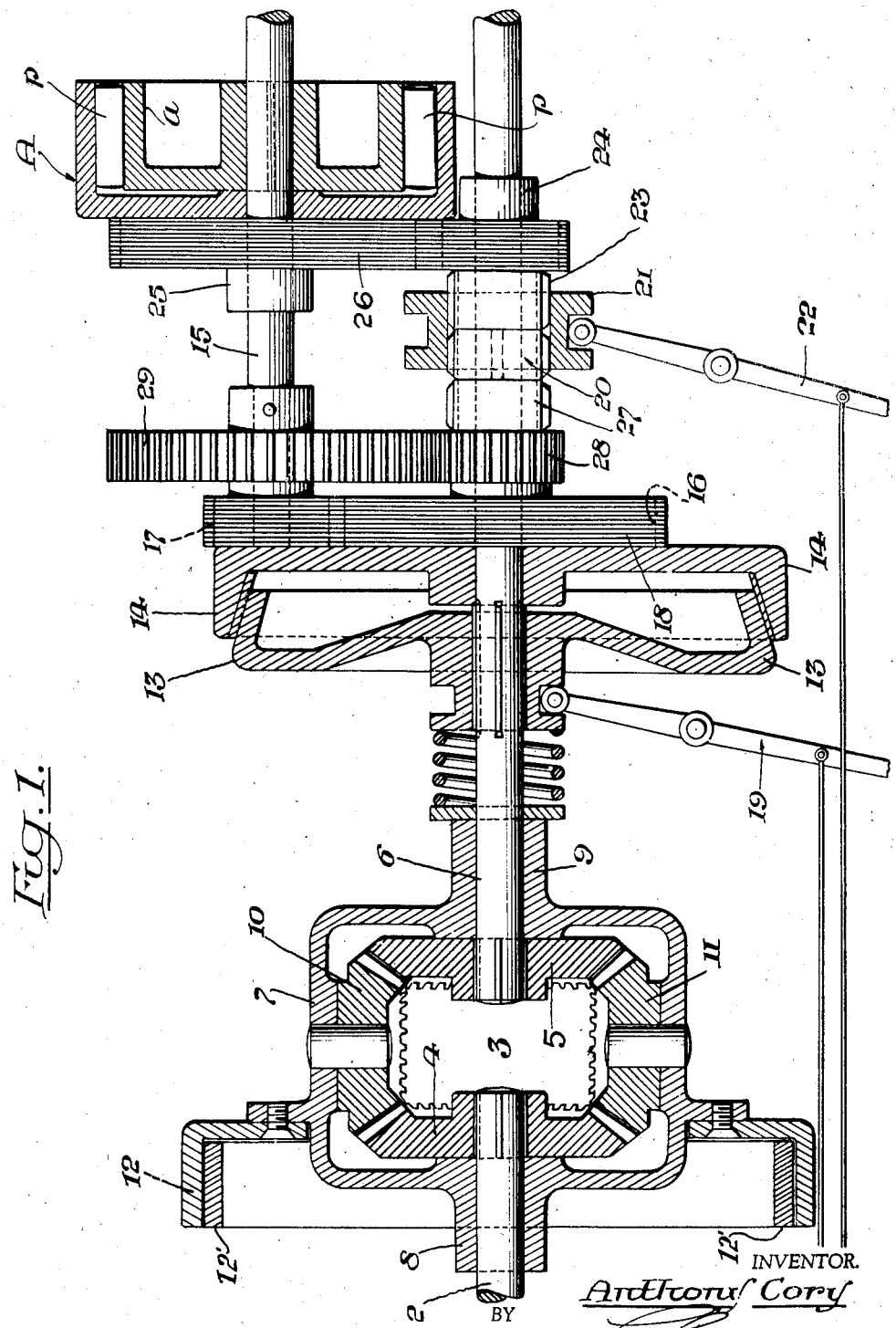
Fig. 1 is a plan view partly in section of this improved transmission.

Before explaining in detail the present improvement or mode of operation thereof, I desire to have it understood that the invention is not limited to the details of construction and arrangement of parts illustrated in the accompanying drawings, since the invention is capable of other embodiments, and that the phraseology employed is for the purpose of description and not of limitation.

Referring to Fig. 1, the power shaft 2 is connected in any suitable manner to a source of power such as a motor (not shown) and this shaft 2 is connected with a differential coupling unit 3 of any suitable kind, one member or gear or which, as the bevel gear 4, is secured to the shaft for rotation therewith. Another member or gear, as the bevel gear 5, is secured to the driving shaft 6.

The housing or carrier 7 of this coupling unit 3 is provided with a pair of hubs 8 aand 9 whereby the carrier, by these hubs is rotatably supported respectively on the power shaft 2 and the driving shaft 6. Gears 10 and 11 carried by the housing mesh with the bevel gears 4 and 5.

Secured to and carried by the housing 7 is a brake 12' and brake drum 12, the object of which will be hereinafter explained.

A spring tensioned clutch having one member 13 slidably keyed for rotation with the driving shaft 6 and the other member 14 freely rotatable thereon is interposed for transmitting power from the shaft 6 to the driven shaft 15 and for this purpose, the member 14 has carried thereby and freely rotatable on the driving shaft 6, a gear 16 which transmits power in any suitable manner to a gear 17 fast on the driven shaft 15. In the present instance, a chain 18 is employed for this purpose. A pivoted lever 19 is provided to shift the clutch member 13 into engagement with the clutch member 14 and this lever 19 is connected to the operating control illustrated in Fig. 4.

The structure so far described constitutes the main drive or normal driving speed of the present device which is indicated as "high" on the control, Fig. 4.

Also carried on the driving shaft 6 for rotation therewith is a splined ring 20.

A suitable slidable sleeve 21, shiftable by means of a lever 22 and connected to the operating control shown in Fig. 4, is provided for shifting into either low gear or reverse. The position of this sleeve in Fig. 1 illustrates low speed and in this position, the sleeve 21 engages a splined hub 23 of a gear 24 free for rotation on the driving shaft 6. The gear 24 is connected in any suitable manner to a gear 25 mounted for independent rotation on the driven shaft 15, and in the present instance a chain 26 is illustrated to provide this connection.

The gear 25 is connected with an overruning clutch which may be in the form of a pawl and ratchet mechanism or its equivalent. In the present instance, the roller type thereof is shown, the gear 25 being free for rotation with the member A of this mechanism A, p, a, the member a of which is secured to the driven shaft 15 while the pawls or rollers p cooperate with the two members A and a to drive the driven shaft 15 when desired, but when the shaft 15 is rotated faster than this driving means, the mechanism will overrun.

Shifting of the sliding sleeve 21 in the opposite direction effects engagement between the member 20 and a splined hub 27 of a gear 28 freely rotatable on the driving shaft 6 to rotate this gear 28, which gear 28 meshes with a gear 29 secured to the driven shaft 15 thereby driving the shaft 15 in a reverse direction.

In the operation of this improved mechanism, when the motor is started, the brake 12' is in released position and when the operating control mechanism of Fig. 4 is placed in the position indicated as "high," this causes engagement of the sleeve 21 with the splined members 20 and 23 and also shifts the clutch member 13 into engagement with the clutch member 14. Due to resistance of the vehicle and also to the fact that the usual brakes are on, the driving shaft remains idle and the power is transmitted freely to rotate the carrier 7.

The usual vehicle brake is then released and the brake 12' gradually applied to the brake drum 12, which gradually slows the rotation of the carrier 7 and the gears 10 and 11 gradually transmit power to the gear 5 thereby gradually rotating the shaft 6. The greater the brake pressure, the faster the shaft 6 will rotate until the carrier 7 is stopped when the full power will be transmitted to the shaft 6 which, in turn, drives the driven shaft 15 at the desired full speed.

It will be noted that the low speed is always connected when the high is connected but due to the gear ratio between the gears 24 and 25, the ratchet mechanism overruns and a resultant gradual and smooth operation is obtained. Should it be desired to use the low ratio gearing as, for instance, on steep hills, etc., the control is moved to "low," causing disengagement of the clutch 13, 14 and effecting driving of the shaft 15 through the mechanism A, p, a.

Thus, when in high speed normally both high and low speed connections are effected between the driving shaft 6 and the driven shaft 15. Due to the fact that the low speed connection includes the ratchet mechanism A, p, a, it will be overrun by the high speed connection. However, since there is a difference in the gear ratios of low and high speed, when the two speeds are simultaneously connected and the vehicle is at rest, there can be no backward rolling because the ratchet mechanism does not permit overrunning in reverse but positively connects the driving and driven shafts. This causes two sets of gears, each having different ratios, to connect the two shafts which obviously results in a locking action.

Reverse drive is effected when the vehicle is idle and when the clutch members 13 and 14 are disengaged, by shifting the sleeve 21 to engage the members 20 and 27 and it will be observed that the application of the brake 12 will then effect a rotation of the shaft 15 in the reverse direction.

In the modification illustrated in Fig. 2, the structure is somewhat similar but the driven shaft 15' is in line with the driving shaft 6'. The power shaft, together with the differential coupling unit and its connection with the driving shaft 6' and brake control are the same and, therefore, these parts 2 to 12 and 12', inclusive, are not again illustrated in the drawings nor described. However, in this modified form, 6' indicates the driving shaft instead of 6.

The clutch member 13' is slidably mounted for rotation on the driving shaft 6' and the cooperating clutch member 14' is fixed to the driven shaft 15' thereby eliminating the transmission of power by the gears 16 and 17 and the chain 18 from the driving shaft to the driven shaft. The clutch member 13' is operated in the same manner by means of the lever 19' connected to the control mechanism of Fig. 4.

Low speed and reverse drive are obtained in a manner similar to that of Fig. 1 except that the power is transmitted from the driving shaft 6' to an intermediate or idler shaft 100 and thence to the driven shaft 15'.

For this purpose, a gear 101 is secured to the driving shaft 6' and this gear meshes with a gear 102 fixed to the idler shaft 100 for rotation therewith. Also carried for rotation by the idler shaft 100 is a slidably shiftable gear 21' shiftable into position for either low speed or reverse. In the position shown in full lines, it is in position for low speed and transmits rotation to a gear 25' loose on the driven shaft 15' and this gear 25' is, in turn, connected to the driven shaft by means of an overrunning clutch mechanism A', p', a' identical to that described as A, p, a, of Fig. 1.

Reverse drive is effected by shifting the gear 21' into mesh with an idler gear 103 which meshes with a gear 29' fixed to the driven shaft 15'. The operation of the mechanism in this form is the same as that of Fig. 1 and it is, therefore, not deemed necessary further to describe it.

In practice, the brake 12' is connected to a control lever or foot pedal which can be gradually applied until the drum 12 stops the carrier 7, at which time the brake control is locked in position which latter, of course, is old and well known and, therefore, it is unnecessary that it be further described herein.

Thus, it will be observed that a vehicle equipped with this improved mechanism may be started in high gear and smoothly and gradually accelerated similar to one equipped with what is commonly called a fluid drive. Furthermore, when so equipped, starting on up-grades is facilitated because when in high, two sets of gears having different ratios are in engagement, preventing any tendency to roll back but permitting forward movement, as before explained, and, on down-grades, the driven shaft is connected with the motor and, therefore, the motor acts as a brake.

Fuel can be saved because it is possible to coast either in "high" by releasing the brake 12', or in "low" without such release which, in effect, is similar to free wheeling and it will be noted that rolling either forward or backward is possible when either the low or reverse speeds are engaged and only forward rolling is possible when the high is engaged. Because of this, when left in high speed on up-grades, no application of the brakes is necessary.

Obviously, any desired ratio of speed between the driven shaft 15 or 15' and the power shaft 2 is possible.

For quiet and efficient operation, the differential may be equipped with spiral gears and ball-bearings throughout and if excessive speed on the differential is not desirable, the speed of the shaft 2 may be reduced and that of the shaft 15 or the rear axle proportionately increased.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same although without attempting to set forth all of the forms in which it may be made, or all of the modes of its use, I claim:

1. Power transmission mechanism for gradually imparting motion from a power source to a driven shaft and including a differential coupling unit having a driving member connected with the power source and a driven member connected with a driving shaft, means for gradually imparting the movement of the driving member to the driven member and the driving shaft, and a plurality of means independently and simultaneously connecting the driving and driven shafts, the simultaneous connection thereof effective to prevent reverse movement of said driven shaft, both of said connecting means including a disengageable clutch mechanism, one for driving the driven shaft at reduced speed when independently connected and overrun when simultaneously engaged.

2. Power transmission mechanism for gradually imparting motion from a power source to a driven shaft and including a differential coupling unit having a driving member connected with the power source and a driven member connected with a driving shaft, means for gradually imparting the movement of the driving member to the driven member and the driving shaft, said last means including means for stopping a member of the coupling unit, and a plurality of means independently and simultaneously connecting the driving and driven shafts, the simultaneous connection thereof effective to prevent reverse movement of said driven shaft, both of said connecting means including a disengageable clutch mechanism, one for driving the driven shaft at reduced speed when independently connected and overrun when simultaneously engaged.

3. Power transmission mechanism for gradually imparting motion from a power source to a driven shaft and including a differential coupling unit having a driving member connected with the power source and a driven member connected with a driving shaft, means for gradually imparting the movement of the driving member to the driven member and the driving shaft, said last means including means for stopping a member of the coupling unit and comprising a brake connected with one of the driven members of said unit, and a plurality of means independently and simultaneously connecting the driving and driven shafts, the simultaneous connection thereof effective to prevent reverse movement of said driven shaft, both of said connecting means including a disengageable clutch mechanism, one for driving the driven shaft at reduced speed when independently connected and overrun when simultaneously engaged.

4. Power transmission mechanism for gradually imparting motion from a power source to a driven shaft and including a differential coupling unit having a driving member connected with the power source and a driven member connected with a driving shaft, means for gradually imparting the movement of the driving member to the driven member and the driving shaft, a plurality of means independently and simultaneously connecting the driving and driven shafts, the simultaneous connection thereof effective to prevent reverse movement of said driven shaft, one of said last means including a disengageable clutch mechanism, and one including means for driving the driven shaft at a reduced speed upon disengagement of said clutch mechanism, said last means including an overrunning clutch overrun by said first clutch mechanism when in engagement.

5. Power transmission mechanism for gradually imparting motion from a power source to a driven shaft and including a differential coupling unit having a driving member connected with the power source and a driven member connected with a driving shaft, means for gradually imparting the movement of the driving member to the driven member and the driving shaft, a plurality of means independently and simultaneously connecting the driving and driven shafts, the simultaneous connection thereof effective to prevent reverse movement of said driven shaft, one of said last means including a disengageable clutch mechanism, and one including means for driving the driven shaft at a reduced speed upon disengagement of said clutch mechanism, said last means including an overrunning clutch overrun by said first clutch mechanism when in engagement, and means for driving the driven shaft in a reverse direction.

6. Power transmission mechanism for gradually imparting motion from a power source to a driven shaft and including a differential coupling unit having a driving member driven by the power source and a driven member driving a driving shaft, means for gradually imparting the movement of the driving member to the driven member and the driving shaft, a plurality of connecting means having different speed ratios simultaneously and independently connecting the driving and driven shafts, the simultaneous connection thereof effective to prevent reverse movement of said driven shaft, and means for disconnecting either or both of said connecting means, one of said connecting means including a disengageable clutch mechanism overrun by the other connecting means when in engagement.

7. Power transmission mechanism for gradually imparting motion from a power source to a driven shaft and including a differential coupling unit having a driving member driven by the power source and a driven member driving a driving shaft, means for gradually imparting the movement of the driving member to the driven member and the driving shaft, a plurality of connecting means having different speed ratios simultaneously and independently connecting the driving and driven shafts, the simultaneous connection thereof effective to prevent reverse movement of said driven shaft, means for disconnecting either or both of said connecting means, one of said connecting means including a disengageable clutch mechanism overrun by the other connecting means when in engagement, and means for connecting the driving and driven shafts for driving the driven shaft in a reverse direction.

8. Power transmission mechanism for gradually imparting motion from a power source to a driven means and including a differential coupling unit having a driving member and a pair of driven members, one freely rotatable, and means for gradually stopping said last member, the other of said driven members having a plurality of cooperative engagements with the driven means operative independently and simultaneously for gradually accelerating the driven means upon the gradual stoppage of said first member, one of said cooperative engagements including a disengageable clutch member, and one a disengageable overrunning clutch mechanism independent of said first clutch member for driving the driven means at reduced speed, the simultaneous connection thereof effective to prevent reverse movement of said driven shaft.

9. Power transmission mechanism for gradually imparting motion from a power source to a driven means and including a differential coupling unit having a driving member and a pair of driven members, one freely rotatable, means for gradually stopping said last member, the other of said driven members having a plurality of cooperative engagements with the driven means operative independently and simultaneously for gradually accelerating the driven means upon the gradual stoppage of said first member, one of said cooperative engagements including a disengageable clutch member and one a disengageable overrunning clutch mechanism independent of said first clutch member for driving the driven means at reduced speed, and means for driving the driven means in a reverse direction, the simultaneous connection thereof effective to prevent reverse movement of said driven shaft.

10. Power transmission mechanism comprising a power source, a driving shaft and a driven shaft, a differential coupling unit between the power source and the driving shaft and having a member driven by the power source, a pair of members driven by said driven member, one connected to the driving shaft and the other freely rotatable, means for gradually stopping said freely rotatable member, the stoppage thereof effective to impart gradual acceleration to the driving shaft, a plurality of means independently and simultaneously connecting the driving and driven shafts to drive the driven shaft, the simultaneous connection thereof effective to prevent reverse movement of said driven shaft, one of said last means including disengageable clutch mechanism, and one operable upon disengagement of said first connecting means for driving the driven shaft at a reduced speed.

11. Power transmission mechanism comprising a power source, a driving shaft and a driven shaft, a differential coupling unit between the power source and the driving shaft and having a member driven by the power source, a pair of members driven by said driven member, one connected to the driving shaft and the other freely rotatable, means for gradually stopping said freely rotatable member, the stoppage thereof effective to impart gradual acceleration to the driving shaft, a plurality of means independently and simultaneously connecting the driving and driven shafts to drive the driven shaft, the simultaneous connection thereof effective to prevent reverse movement of said driven shaft, one of said last means including disengageable clutch mechanism, and one operable upon disengagement of said first connecting means for driving the driven shaft at a reduced speed, said last means comprising an overrunning clutch mechanism ineffective to drive the driven shaft when said first means is in engagement.

ANTHONY CORY.